United States Patent [19]

Shilling

[11] 4,063,610
[45] Dec. 20, 1977

[54] VEHICLE THEFT-PREVENTION SYSTEM

[76] Inventor: Robert A. Shilling, 22310 39th Ave. West, Mountlake Terrace, Wash. 98043

[21] Appl. No.: 668,838

[22] Filed: Mar. 22, 1976

[51] Int. Cl.² ............................................. B60R 25/04
[52] U.S. Cl. .............................. 180/114; 123/146.5 B; 307/10 AT; 340/64
[58] Field of Search .................... 180/114; 307/10 AT; 340/63, 64; 315/209, 215; 123/146.5 B

[56] References Cited

U.S. PATENT DOCUMENTS

| | | | |
|---|---|---|---|
| 2,928,488 | 3/1960 | Stephen | 180/114 X |
| 3,158,749 | 11/1964 | McAllister | 307/10 AT |
| 3,194,970 | 7/1965 | Claps | 307/10 AT |
| 3,464,060 | 8/1969 | Arditti | 340/64 |
| 3,614,460 | 10/1971 | Hale | 180/114 X |
| 3,634,724 | 1/1972 | Vest | 180/114 X |
| 3,885,164 | 5/1975 | Vest | 180/114 X |

Primary Examiner—Joseph F. Peters, Jr.
Assistant Examiner—Terrance L. Siemens
Attorney, Agent, or Firm—Seed, Berry, Vernon & Baynham

[57] ABSTRACT

A vehicle theft-prevention system having a concealed switch operable to disable the ignition system of an internal combustion engine. The concealed switch is of the single pole, double throw variety having one terminal grounded and the other terminal connected to a wire which taps the wire connecting the ignition switch to the coil primary. When the concealed switch is closed, current flowing from the ignition switch is shunted to ground without flowing through the coil thereby rendering the internal combustion engine inoperable.

1 Claim, 2 Drawing Figures

VEHICLE THEFT-PREVENTION SYSTEM

BACKGROUND OF THE INVENTION

1. Field of the Invention

This invention relates to devices for preventing vehicle thefts, and, more particularly, to such devices which selectively disable the ignition system of internal combustion engines.

2. Description of the Prior Art

Attempts have been made to curb vehicle thefts utilizing a wide variety of systems, both mechanical and electrical in nature. These systems have generally been ineffective for a variety of reasons, primarily that they are easily circumvented or disabled by a thief. Those devices which are effective in preventing vehicle theft are generally somewhat expensive and are therefore not widely used.

SUMMARY OF THE INVENTION

It is an object of the invention to provide a theft-prevention system which is easily installed on a vehicle in a relatively short time without the use of specialized tools.

It is another object of the invention to provide a theft-prevention system which is relatively inexpensive when compared with known devices employed for that purpose.

It is still another object of the invention to provide a theft-prevention system which is relatively effective insofar as it is not readily discoverable or easily disabled by potential thieves.

These and other objects of the invention are accomplished by a vehicle theft-prevention system including a concealed switch which disables the engine ignition system when the switch is in its closed position. The switch taps into the wire connecting the ignition switch to the coil so that when the concealed switch is closed, current is shunted from the coil to ground thereby rendering the ignition system inoperable.

DETAILED DESCRIPTION OF THE INVENTION

Figure 1:
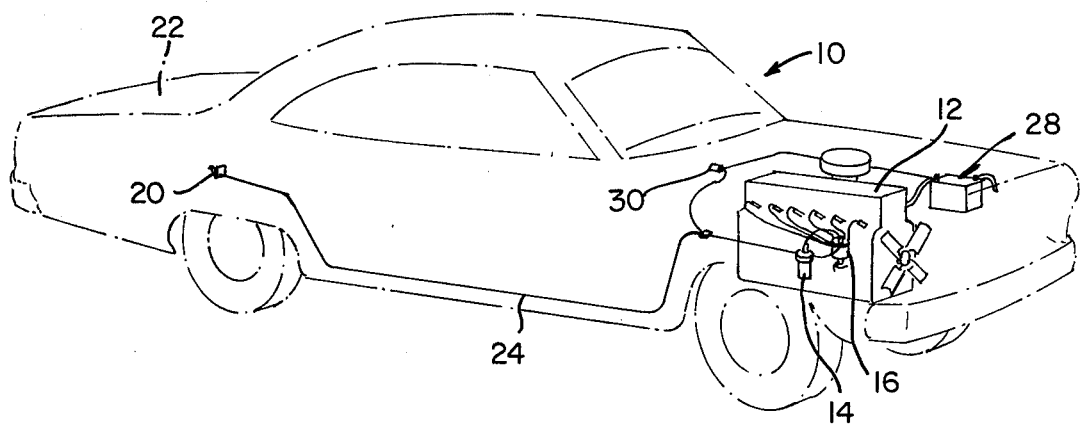
FIG. 1 is an isometric view illustrating one installation of the theft-prevention system installed in a vehicle.

The vehicle theft-prevention system is shown installed on a conventional vehicle 10 in FIG. 1. The vehicle 10 is powered by a conventional internal combustion engine 12 having an ignition system including an ignition coil 14 and a distributor 16. Power is supplied to the primary of the coil 14 through a supply wire 18. The theft-prevention system includes a single pole, signal throw switch 20 mounted to the vehicle 10 at a concealed point, such as to the wall of the trunk 22. The switch 20 is connected to the ignition system of the engine 12 through a wire 24 routed from the rear of the vehicle to the front in a concealed manner.

Figure 2:
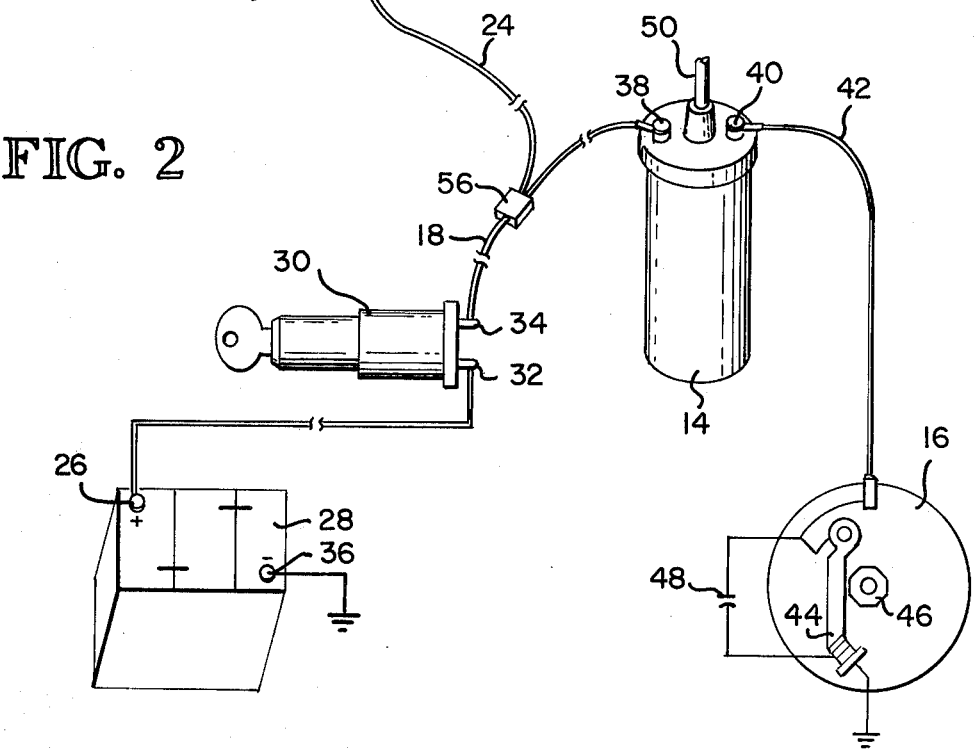
FIG. 2 is a pictorial schematic of the vehicle theft-prevention system.

Additional features of the vehicle ignition system are illustrated in FIG. 2. The supply line 18 is connected to the positive terminal 26 of a battery 28 through an ignition switch 30 having a pair of terminals 32,34 which are normally connected to each other when the vehicle is in operation. The negative terminal 36 of the battery 28 is normally connected to a chassis ground. Thus, when the switch 30 is in its closed position, power is supplied to primary terminal 38 of the coil 14 through supply wire 18. The remaining primary terminal 40 of the coil 14 is connected to the distributor 16 through a wire 42. The conventional distributor 16 includes breaker points 44 which are actuated by a cam 46 rotating in synchronism with the engine crankshaft (not shown). When the breaker points 44 are closed, the wire 42 is connected to chassis ground thereby charging the primary of the coil 14. When the breaker points 44 open responsive to rotation of the cam 46, the coil 14 in combination with a capacitor 48 oscillates thereby generating a high voltage ignition signal on the high tension line 50.

The concealed switch 20 may be of the single pole, single throw variety having a terminal 52 which is connected to the wire 24 when the switch 20 is in its closed position. One of the terminals 52 is mounted directly to a wall of the trunk 22 which is at chassis ground potential. The shunt wire 24 extending into the housing of the concealed switch 20 taps into the supply line 18, preferably at a point on line 18 as close to the positive terminal 38 as possible. This is to prevent anyone from severing the line 18 and bypassing the theft-prevention system. The length, size and construction of the wire 24 is not critical except that the wire must be of sufficient size to conduct the required quantity of current. In one operational embodiment, number 18 wire has been found to be sufficient for this purpose. Although any variety of tapping system may be used to connect the shunt wire 24 to the supply wire 18, the use of a connector clip 56 as sold by the 3-M Company of Minneapolis, Minn., provides a quick and secure connection at relatively slight expense.

The theft-prevention system is installed by mounting the terminal 52 of the switch 20 to the vehicle chassis at any concealed point within the vehicle including, but not limited to, the trunk. The shunt wire 24 is inconspicuously routed from the switch 20 to the engine compartment and clipped to the supply wire 18 at a point spaced from the distributor 14 which is preferably concealed from casual view so that the theft-prevention system is not readily discoverable by a potential vehicle thief.

In operation, the owner or other authorized vehicle user places the switch 20 in its open position before starting the internal combustion engine 12 of the vehicle 10. When the vehicle 10 is to be parked, the switch 20 is placed in its closed position so that any current flowing through the ignition switch 30 is shunted to chassis ground by the switch 20 thereby preventing current from flowing through the primary of the coil 14. Under these circumstances, it is impossible to start the engine 12 of the vehicle 10. Since the switch 20, shunt wire 24 and connector clip 56 are relatively inconspicuous, only the owner or authorized user of the vehicle is aware that the vehicle is protected, and, therefore, only such individuals are able to disable the theft-prevention system in order to allow use of the vehicle.

The system disclosed herein can be incorporated with the vehicle as manufactured, if desired.

Alternatives to switch 20 may be employed. For example, the switch housing may be coated on one side with an adhesive with a strippable release paper covering the adhesive. When installing the switch the release paper is removed and the switch adhesively bonded to the vehicle at any desired point. Rather than a switch an electronic member may be employed having variable visible indicia which have to be synchronized by the operator of the vehicle in a particular sequence in order to disable the theft-prevention system and allow use of the vehicle.

The embodiments of the invention in which a particular property or privilege is claimed are defined as follows:

1. A vehicle theft-prevention system for selectively disabling an internal combustion engine having an ignition coil with its primary connected between a supply wire and distributor, said system comprising a concealed switch having a first terminal connected to a ground point of said vehicle and a second terminal in electrical contact with the supply wire through a shunt at a point spaced apart from said coil such that the said shunt wire is not readily discoverable by examining said coil so that the primary of said coil is shunted by said switch when said switch is in its closed position thereby rendering said internal combustion engine inoperable.

* * * * *